(12) United States Patent
Saleem

(10) Patent No.: US 10,017,940 B2
(45) Date of Patent: Jul. 10, 2018

(54) REINFORCED BRICK MASONRY COLUMN WITH POLYESTER THREAD REINFORCEMENT STRIPS

(71) Applicant: Imam Abdulrahman Bin Faisal University, Dammam (SA)

(72) Inventor: Muhammad Saleem, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 15/834,330

(22) Filed: Dec. 7, 2017

(65) Prior Publication Data

US 2018/0106035 A1 Apr. 19, 2018

Related U.S. Application Data

(62) Division of application No. 15/629,107, filed on Jun. 21, 2017, which is a division of application No.
(Continued)

(51) Int. Cl.
*E04B 1/98* (2006.01)
*E04H 9/02* (2006.01)
(Continued)

(52) U.S. Cl.
CPC .............. *E04B 1/98* (2013.01); *B29C 65/48* (2013.01); *B29C 65/72* (2013.01); *B29C 65/74* (2013.01); *E04B 1/04* (2013.01); *E04C 3/34* (2013.01); *E04C 5/073* (2013.01); *E04H 9/021* (2013.01); *B29L 2031/10* (2013.01); *E04B 2103/02* (2013.01)

(58) Field of Classification Search
CPC .......... E04B 1/98; E04B 1/04; E04B 2103/02; B29C 65/48; B29C 65/72; B29C 65/74; E04C 5/073; E04C 3/34; E04H 9/023; B29L 2031/02
See application file for complete search history.

(56) References Cited

U.S. PATENT DOCUMENTS 2,161,802 A 6/1939 De Ganahl
3,161,941 A * 12/1964 Heinz ................ D03J 1/16
156/158

(Continued)

FOREIGN PATENT DOCUMENTS

GB 142326 A * 5/1920 ............ B65H 54/24
JP 54158462 A * 12/1979

OTHER PUBLICATIONS

Khan Shahzada, et al., "Retrofitting of Brick Masonry Columns by Ferocementing", International Journal of Advanced Structures and Geotechnical Engineering, vol. 1, No. 2, Oct. 2012, 4 pages.

*Primary Examiner* — Jeanette E Chapman
(74) *Attorney, Agent, or Firm* — Oblon, McClelland, Maier & Neustadt, L.L.P.

(57) ABSTRACT

A method of reinforcing a masonry structure is described wherein polyester thread reinforcement strips are manufactured and mounted on the masonry structure to protect it from lateral forces caused by earthquake and other natural occurring phenomena that generally produce bending moments in the masonry structure. The disclosed method can easily and economically be applied to reinforce masonry structures in underprivileged regions.

3 Claims, 15 Drawing Sheets

Related U.S. Application Data

15/058,593, filed on Mar. 2, 2016, now Pat. No. 9,797,133.

(51) Int. Cl.
  *B29C 65/74* (2006.01)
  *B29C 65/72* (2006.01)
  *B29C 65/48* (2006.01)
  *E04C 5/07* (2006.01)
  *E04C 3/34* (2006.01)
  *E04B 1/04* (2006.01)
  *B29L 31/10* (2006.01)

(56) References Cited

U.S. PATENT DOCUMENTS

| | | | |
|---|---|---|---|
| 3,246,744 A | 4/1966 | Marnon | |
| 3,458,374 A * | 7/1969 | Shobert | F16C 33/201 156/149 |
| 3,550,667 A | 12/1970 | Sidles | |
| 3,632,708 A | 1/1972 | Mandorf, Jr. | |
| 3,834,634 A * | 9/1974 | Havlas | B65H 69/00 242/475.4 |
| 4,177,957 A * | 12/1979 | Lucke | B65H 63/088 242/125.1 |
| 4,617,219 A | 10/1986 | Schupack | |
| 4,706,430 A | 11/1987 | Sugita | |
| 4,715,560 A | 12/1987 | Loyek | |
| 4,990,390 A | 2/1991 | Kawasaki | |
| 5,025,605 A | 6/1991 | Sekijima | |
| 5,251,420 A | 10/1993 | Johnson | |
| 6,219,988 B1 | 4/2001 | Mahfouz | |
| 6,345,483 B1 | 2/2002 | Clark | |
| 6,692,595 B2 | 2/2004 | Wheatley | |
| 6,701,683 B2 | 3/2004 | Messenger | |
| 6,898,908 B2 | 5/2005 | Messenger | |
| 7,086,129 B2 * | 8/2006 | Kissels | D02H 7/00 28/185 |
| 7,100,336 B2 | 9/2006 | Messenger | |
| 7,185,778 B1 | 3/2007 | Palley et al. | |
| 8,511,043 B2 | 8/2013 | Fyfe | |
| 8,713,887 B2 | 5/2014 | Williams | |
| 2008/0223857 A1 | 9/2008 | Palley | |
| 2017/0101239 A1 | 4/2017 | Ivosevic | |

* cited by examiner

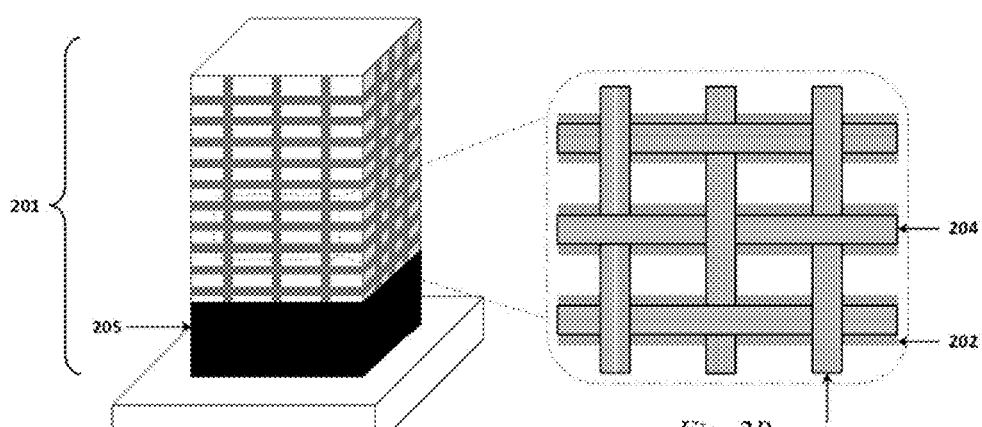

REINFORCED BRICK MASONRY COLUMN WITH POLYESTER THREAD REINFORCEMENT STRIPS

CROSS-REFERENCE TO RELATED APPLICATIONS

This application is a divisional application of U.S. application Ser. No. 15/629,107, filed Jun. 21, 2017, which is a divisional of U.S. application Ser. No. 15/058,593, filed Mar. 2, 2016, now U.S. Pat. No. 9,797,133, the entire contents of which are incorporated herein by reference.

BACKGROUND OF THE INVENTION

Technical Field

The present invention relates to a reinforced brick masonry column with polyester thread reinforcement strips.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A masonry structure is generally defined as an assembly of stones, blocks and/or bricks laid one above the other using a binding material e.g. a cement mortar. These masonry structures are adequately resistant to vertical in-plane loads, yet pose limited resistance to lateral forces caused by earthquakes, tornados, etc. due to low flexural strength and toughness. Several earthquakes in the recent history such as the Great Tohoku Kanto earthquake in March 2011 in Japan, the earthquake in Chile in 2010, and the earthquake in the Northern areas of Pakistan in October 2005 were the deadliest for the people living in masonry structures. These events left a vast trail of destruction and crippled the economies of these countries but in spite of the dangers, people in rural areas continue to rely on masonry because it is economical, durable and does not require a highly skilled labor [Ashraf. M.: "Development of low-cost and efficient retrofitting technique for unreinforced masonry buildings", Ph.D. Dissertation, University of Engineering & Technology, Peshawar, Pakistan, (2010); Smith, A., and Redman, T.: "A critical review of retrofitting methods for unreinforced masonry structures", EWB-UK Research Conference, Hosted by The Royal Academy of Engineering, 20th Feb. (2009); Mayorca, P. and Meguro, K.: "Proposal of an efficient technique for retrofitting unreinforced masonry dwellings", Proceeding of 13th world conference on earthquake engineering Vancouver, B.C, Canada., I: 22-29, Aug. (2004); Javed, M.: "Seismic Risk Assessment of Unreinforced Brick Masonry Systems of Northern Pakistan", Ph.D. Dissertation, University of Engineering & Technology, Peshawar, Pakistan, (2009); each incorporated herein by reference in its entirety].

In the past several decades, research has been dedicated toward strengthening and rehabilitating masonry structures. New methods have shown to be effective against earthquakes [Ishibashi, T. and Tsukishima, D.: "Seismic damage of and seismic rehabilitation techniques for railway reinforced concrete structures", Journal of Advanced Concrete Technology, 7(3): 287-296 (2009); Cook, R. A., Doerr, G. T. and Klingner, R. E.: "Bond stress model for design of adhesive anchors", ACI Structural Journal, 90(5): 514-24 (1993); Cook, R. A., Kunz J., Fuchs W. and Konz, R. C.: "Behavior and design of single adhesive anchors under tensile load in uncracked concrete", ACI Structural Journal, 95(1): 9-26 (1998); Zamora, N. A., Cook, R. A., Konz, R. C. and Consolazio, G. R.: "Behavior and design of single, headed and unheaded, grouted anchors under tensile load", ACI Structural Journal, 100(2): 222-30 (2003); Saleem, M. and Tsubaki, T.: "Multi-layer model for pull-out behavior of post-installed anchor", Proc. FRAMCOS-7, Fracture Mechanics of Concrete Structures, AEDIFICATIO publishers, Germany, II: 823-830 (2010); Saleem, M.: "Cyclic Pull-out Push-in Shear-Lag Model for Post-Installed Anchor Infill Assembly", Arabian Journal of Science & Technology, Volume 39, Issue 12, pp. 8537-8547, December 2014, Springer, DOI 10.1007/s13369-014-1423-x; Hameed, A., Saleem, M., Qazi, A. U., Saeed, S., Ilyas, M. & Bashir, A.: "Mitigation of Seismic Pounding between Adjacent Buildings", Pakistan Journal of Science, ISSN: 0030-9877, Vol. 64, No. 4, Pg. 326-333, December, 2012; Hameed, A., Saleem, M., Qazi, A. U., & Rizwana, H.: "Seismic Response Evaluation of Base Isolated Buildings", Pakistan Journal of Science, ISSN: 0030-9877, Vol. 65, No. 1, Pg. 46-54, March, 2013.; each incorporated herein by reference in its entirety]. Many of these techniques employ post-installed anchor bars for the retrofitting process. Among those, the most common techniques for increasing the confinement and performance of structures are fiber reinforced polymer wraps, post tensioning, steel jacketing, ferro-cement jacketing, concrete jacketing, and shortcreting [Ishibashi, T. and Tsukishima, D.: "Seismic damage of and seismic rehabilitation techniques for railway reinforced concrete structures", Journal of Advanced Concrete Technology, 7(3): 287-296 (2009); Cook, R. A., Kunz J., Fuchs W. and Konz, R. C.: "Behavior and design of single adhesive anchors under tensile load in uncracked concrete", ACI Structural Journal, 95(1): 9-26 (1998); Zamora, N. A., Cook, R. A., Konz, R. C. and Consolazio, G. R.: "Behavior and design of single, headed and unheaded, grouted anchors under tensile load", ACI Structural Journal, 100(2): 222-30 (2003); Saleem, M. and Tsubaki, T.: "Multi-layer model for pull-out behavior of post-installed anchor", Proc. FRAMCOS-7, Fracture Mechanics of Concrete Structures, AEDIFICATIO publishers, Germany, II: 823-830 (2010); Saleem, M.: "Cyclic Pull-out Push-in Shear-Lag Model for Post-Installed Anchor Infill Assembly", Arabian Journal of Science & Technology, Volume 39, Issue 12, pp. 8537-8547, December 2014, Springer, DOI 10.1007/s13369-014-1423-x; Hameed, A., Saleem, M., Qazi, A. U., Sae, Saeed, S., Ilyas, M. & Bashir, A.: "Mitigation of Seismic Pounding between Adjacent Buildings", Pakistan Journal of Science, ISSN: 0030-9877, Vol. 64, No. 4, Pg. 326-333, December, 2012; Zhuge, Y.: "FRP-Retrofitted URM Walls under in Plane Shear: Review and Assessment of Available Models", ASCE Journal of Composites for Construction, 14(6): 743-753, (2010); Meguro, K., Mayorca, P., Sathiparan, N., Guragain, R., and Nesheli, N.: "Shaking Table Tests of ¼ Scaled Masonry Models Retrofitted with PP-band Meshes", Proceedings of the Third International Symposium on New Technologies for Urban Safety of Mega Cities in Asia, Singapore, 1: 9-18, (2005); Coburn, A. and Spence, R.: "Earthquake Protection", West Sussex: John Wiley & Sons Ltd., ISBN 0-471-49614-6, (2002); Yoshimura, M. and Meguro, K.: "Proposal of Retrofitting Promotion System for Low Earthquake-Resistant Structures in Earthquake Prone Countries", Proceedings on 13th World Conference on Earthquake Engineering, Vancouver, Canada, 1(927): 221-235, (2004); Navaratnarajah, S.:" Experimental study of PP-band mesh seismic retrofitting for low earthquake masonry resisting structures: PhD Dissertation, Department of Civil Engineering, University of Tokyo, Japan, (2008); Hamid, M. and Ingham, J. S.: "Diagonal Compression Testing of FRP Retrofitted Unreinforced Clay Burnt bricks masonry Wallets", Journal of Composites for Construction, 15(5): 810-820, (2011); Turco, V., Secondin, S., Morbin, A., Valluzzi, M. R., and Modena, C.: "Flexural and shear strengthening of unreinforced masonry with FRP bars", Composites Science and Technology, 6(1): 289-296, (2006); Sathiparan, N., Mayorca, P., Nesheli, K. N., Guragain, R. and Meguro, K.: "Experimental study on in-plain and out-of-plain behaviour of Masonry Wallettes retrofitted by PP-Band meshes", Seisan Kenkyu, 58 (3): 197-213 (2006); Bakhteri, J., Makhtar, A., and Sambasivam, S.: "Finite Element Modeling of Structural Clay Brick Masonry Subjected To Axial Compression", Jurnal Tecknologi, 41(B): 221-231, (2004); Farooq, S. H., Ilyas, M. and (Ghaffar, A.: "Technique for strengthening of masonry wall panels using steel strips", Asian Journal of Civil Engineering (Building and Housing), 7(6): 972-985, (2006); Macabuag, J.: "Dissemination of Seismic Retrofitting Techniques to Rural Communities", EWB-UK National Research Conference, I: 13-17, (2010); each incorporated herein by reference in its entirety]. However, these techniques usually require skilled labor, understanding of structural complexities, overcoming issues related to the lack of connectivity of the retrofitting material to the masonry [Yoshimura, M. and Meguro, K.: "Proposal of Retrofitting Promotion System for Low Earthquake-Resistant Structures in Earthquake Prone Countries", Proceedings on 13th World Conference on Earthquake Engineering, Vancouver, Canada, 1(927): 221-235, (2004); Navaratnarajah, S.:" Experimental study of PP-band mesh seismic retrofitting for low earthquake masonry resisting structures: PhD Dissertation, Department of Civil Engineering, University of Tokyo, Japan, (2008); each incorporated herein by reference in its entirety], and mostly involve large expenses to strengthen the structures. However, little attention in the past has been focused on developing a low-cost practical solution for strengthening unreinforced masonry structures in underprivileged localities.

In view of the forgoing, one objective of the present invention is to provide a reinforced brick masonry column, and a method for reinforcing a masonry structure by effectively mounting and tightening reinforcement strips, which are made of a plurality of polyester threads and a matrix material (e.g. an adhesive), to protect the masonry structure from lateral forces caused by earthquakes and other natural occurring phenomena that generally produce bending moments in the masonry structure. The disclosed method can easily and economically be applied to reinforce masonry structures in underprivileged regions.

BRIEF SUMMARY OF THE INVENTION

According to a first aspect, the present disclosure relates to a reinforced brick masonry column, involving i) a brick masonry column having a rectilinear cross-section comprising bricks and a mortar that holds the bricks together at a plurality of horizontal bed joints, ii) at least one primary bonding tape wrapped around the horizontal bed joints, iii) at least one horizontally mounted polyester thread reinforcement strip wrapped around the horizontal bed joints on top of the primary bonding tape, iv) at least one vertically mounted polyester thread reinforcement strip located on each side of the brick masonry column., v) at least one secondary bonding tape wrapped around the horizontally mounted polyester thread reinforcement strips, vi) a wrapping material that is wrapped horizontally around the perimeter of the brick masonry column, the primary bonding tape, the horizontally mounted polyester thread reinforcement strips, the vertically mounted polyester thread reinforcement strips, the secondary bonding tape, or any combination thereof.

In one embodiment, the vertically mounted and the horizontally mounted polyester thread reinforcement strips comprise a plurality of parallel and adjacent polyester threads and an adhesive that holds the polyester threads together with no gap therebetween.

In one embodiment, the adhesive is at least one selected from the group consisting of an epoxy, a urethane, a polyimide, an acrylate, a polyvinyl acetate, and a polyethylene-vinyl acetate.

In one embodiment, the vertically mounted polyester thread reinforcement strips interweave through the horizontally mounted polyester thread reinforcement strips.

In one embodiment, the width and the thickness of the vertically mounted polyester thread reinforcement strips are substantially similar to the width and the thickness of the horizontally mounted polyester thread reinforcement strips.

In one embodiment, the thickness of the vertically mounted polyester thread reinforcement strips is at least 5% greater than the thickness of the horizontally mounted polyester thread reinforcement strips.

In one embodiment, the width of the vertically mounted polyester thread reinforcement strips is at least 5% greater than the width of the horizontally mounted polyester thread reinforcement strips.

In one embodiment, the width of the horizontally mounted polyester thread reinforcement strips is in the range of 10-30 mm relative to the horizontal bed joints having a width in the range of 5-15 mm, and wherein the horizontally mounted polyester thread reinforcement strips entirely cover the horizontal bed joints.

In one embodiment, the width of the horizontally mounted polyester thread reinforcement strips is in the range of 10-30 mm relative to the brick masonry column having a height in the range of 1-10 m.

In one embodiment, the wrapping material covers at least half of the height of the reinforced brick masonry column.

In one embodiment, the reinforced brick masonry column has at least one of the following properties, i) a failure peak ground acceleration at least 9% higher than a failure peak ground acceleration in the brick masonry column, ii) a strain energy before failure at least 5% higher than a strain energy before failure in the brick masonry column, iii) a post-failure displacement at the top of the reinforced brick masonry column at least 20% lower than a post-failure displacement at the top of the brick masonry column, or iv) a post-failure crack width that is narrower than a post-failure crack width in the brick masonry column.

According to a second aspect, the present disclosure relates to a method of strengthening a brick masonry column comprising bricks and a mortar that holds the bricks together at a plurality of horizontal bed joints, the method involving i) wrapping each horizontal bed joint in the brick masonry column with at least one layer of a primary bonding tape, ii) wrapping a polyester thread reinforcement strip on the primary bonding tape at each horizontal bed joint to form horizontally mounted polyester thread reinforcement strips, iii) vertically mounting at least one polyester thread reinforcement strip on each side of the brick masonry column by interweaving through the horizontally mounted polyester thread reinforcement strips to form a meshed structure that is wrapped around the brick masonry column, iv) wrapping the horizontally mounted polyester thread reinforcement strips with at least one layer of a secondary bonding tape, v) covering at least a portion of the brick masonry column, the primary bonding tape, the meshed structure, the secondary bonding tape, or combinations thereof with at least one layer of a wrapping material.

In one embodiment, a first horizontal bed joint from the bottom of the brick masonry column is wrapped with at least one layer of the primary bonding tape and at least two layers of the horizontally mounted polyester thread reinforcement strips.

In one embodiment, at least two polyester thread reinforcement strips are vertically mounted on each side of the brick masonry column and the two polyester thread reinforcement strips are separated by a distance of at least 2 cm.

In one embodiment, the meshed structure has a rectangular shape in the size range of 2-30 cm by 2-30 cm.

In one embodiment, the width of the horizontally mounted polyester thread reinforcement strips is in the range of 10-30 mm relative to the horizontal bed joints having a width in the range of 5-15 mm, wherein the horizontally mounted polyester thread reinforcement strips entirely cover the horizontal bed joints.

In one embodiment, the width of the horizontally mounted polyester thread reinforcement strips is in the range of 10-30 mm relative to the brick masonry column having a height in the range of 1-10 m.

According to a third aspect, the present disclosure relates to a method of manufacturing polyester thread reinforcement strips, involving i) tying a first end of a polyester thread to a first pole of a structure comprising the first pole and a second pole, wherein the first pole and the second pole are parallel and separated by at least 20 cm, ii) winding a second end of the polyester thread around the second pole of the structure and returning the second end of the polyester thread to the first pole in stretched form to make a wound cycle, wherein the polyester thread is perpendicular to the first and second poles, iii) repeating the winding at least 30 times in a back and forth movement to form a polyester thread assembly, wherein each polyester thread is adjacent and parallel to the polyester thread from a previous wound cycle, and wherein no gap is present between the adjacent and parallel polyester threads, iv) applying an adhesive to the polyester thread assembly, v) curing and/or drying the adhesive, vi) cutting the polyester thread assembly along the first and second poles and at least 1 cm from each pole to make the polyester thread reinforcement strip.

In one embodiment, the cutting forms cut edges on opposing sides of the polyester thread reinforcement strip, and the method further comprises sealing the cut edges of the polyester thread reinforcement strip by heating, annealing and/or taping.

In one embodiment, the polyester thread reinforcement strip has an ultimate tensile strength at least four times larger and a maximum tensile load bearing capacity at least three times larger than a substantially similar strip with polypropylene threads instead of polyester threads.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A is a representation of a reinforced brick masonry column with polyester thread reinforcement strips wrapped around the reinforced brick masonry column.

FIG. 2B is a representation of interwoven polyester thread reinforcement strips mounted on the reinforced brick masonry column.

DETAILED DESCRIPTION OF THE EMBODIMENTS

Figures 1A, 1B:
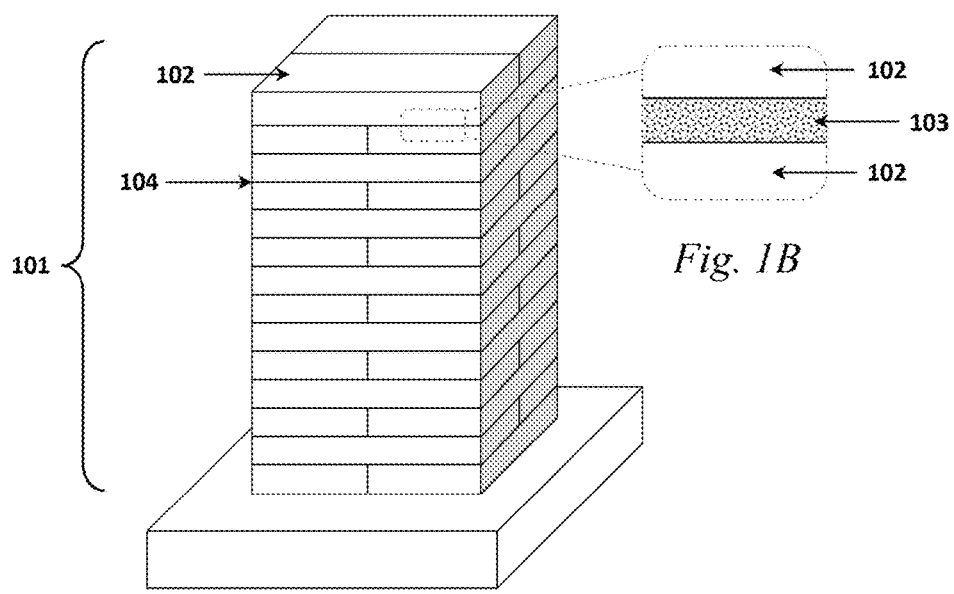
FIG. 1A is a representation of a brick masonry column.
FIG. 1B is a magnified representation of a horizontal bed joint, wherein two adjoining bricks are bonded together by a mortar.

Referring now to the drawings, wherein like reference numerals designate identical or corresponding parts throughout the several views.

According to a first aspect, the present disclosure relates to a reinforced brick masonry column 201, involving a brick masonry column 101 having a rectilinear cross-section comprising bricks 102 and a mortar 103 that bonds the bricks 102 together at a plurality of horizontal bed joints 104.

Horizontal bed joints as used herein, refers to bed joints that form an angle in the range of 0-30 degrees, preferably 0-10 degrees, more preferably 0-5 degrees with horizon.

Masonry column as used herein refers to a structure that is constructed from building blocks laid in and bound together by a mortar 103. The building blocks may be brick, marble, granite, travertine, limestone, cast stone, concrete block, glass block, and/or cob, although, brick and concrete blocks are the most common types of building blocks. Masonry columns are durable forms of construction. Durability of a masonry column may vary significantly depending on the type of the building blocks, the quality of mortar, and the pattern in which the building blocks are assembled. Masonry columns are resistant to projectiles, e.g. debris from hurricanes or tornadoes. Masonry columns have high compressive strength under vertical loads, but they show a very limited strength when bending, stretching, or twisting.

Mortar as used herein refers to a paste-like adhesive used to bind the building blocks together at bed joints, wherein adjacent surfaces of adjoining bricks meet. The mortar comprises at least a portion of a binder (e.g. cement), a portion of water, and a portion of an aggregate (e.g. sand).

In one or more embodiments, Portland cement may be used to bind the sand aggregate, wherein the weight ratio of cement to sand may be in the range of 0.05-0.6, preferably 0.15-0.4, and more preferably 0.25.

In one embodiment, the mortar 103 may be cured for duration in the range of 2-200 hours, preferably 150-200 hours, and more preferably 170 hours.

In one embodiment, bonding of the brick masonry column 101 is at least one selected from the group consisting of Flemish bond, Monk bond, Sussex bond, English bond, English cross bond, Scottish bond, American bond, Stretcher bond, and Header bond.

In one embodiment, the bricks 102 may have rectangular cross-section, wherein the length is in the range of 10-50 cm, preferably 15-40 cm, and more preferably 23 cm. The bricks 102 may have a width in the range of 3-30 cm, preferably 5-15 cm, and more preferably 11 cm. The bricks 102 may have a thickness in the range of 2-20 cm, preferably 3-12 cm, and more preferably 8 cm. Although these dimension ranges for the bricks are preferred, they are not limiting the brick sizes, and brick dimensions outside of these ranges may also be used. In one embodiment, the bricks 102 may have a polygonal cross-section e.g. triangular, pentagonal (5-sided), and/or hexagonal (6-sided).

In one embodiment, the brick masonry column 101 has a rectangular cross-section, wherein the length is in the range of 0.05-10 m, preferably 0.1-1 m, more preferably 0.25 m relative to the width of the brick masonry column 101 in the range of 0.05-0.5 m, preferably 0.2-0.3 m, more preferably 0.25 m. In one embodiment, the height of the brick masonry column 101 may be in the range of 1-10 m, preferably 1-5 m, more preferably 1.5-3 m.

In one embodiment, the width of the horizontal bed joints 104 may be in the range of 5-80 mm, preferably 5-30 mm, more preferably 5-15 mm, relative to the height of the brick masonry column 101 in the range of 1-10 m, preferably 1-5 m, more preferably 1.5-3 m.

The reinforced brick masonry column 201, further includes primary bonding tape 202 wrapped around the horizontal bed joints 104.

The primary bonding tape as used herein may refer to any tape that has a length and a width and has an adhesive layer on at least one side of the tape. In one embodiment, the primary bonding tape 202 may be a single-sided tape (i.e. a layer of an adhesive on one side of the tape), or a double-sided tape (i.e. two layers of an adhesive on both sides of the tape). In one embodiment, the tape in the primary bonding tape 202 may be made of plastic (e.g. vinyl or latex), or fabric (e.g. cotton or polyester), and the adhesive layer may be alkyl-acrylates and/or rubber-based adhesives. In one embodiment, the primary bonding tape 202 may be duct tape, bondage tape, electrical tape, scotch tape, Gorilla Tape®, and/or surgical tape, etc.

In one embodiment, at least one layer of the primary bonding tape 202 may be wrapped around one or more horizontal bed joints 104.

In one embodiment, the width of the horizontal bed joints 104 is in the range of 5-80 nm, preferably 5-30 nm, and more preferably 5-15 nm, and the primary bonding tape 202 has a width in the range of 10-100 mm, preferably 10-60 nm, more preferably 10-40 mm, and the primary bonding tape 202 may entirely cover the horizontal bed joints 104. In one embodiment, the primary bonding tape 202 may cover at least a portion of the adjoining bricks.

The reinforced brick masonry column 201, further involves horizontally mounted polyester thread reinforcement strips 204 wrapped around the horizontal bed joints 104 on top of the primary bonding tape 202.

The horizontally mounted polyester thread reinforcement strips as used herein comprise a plurality of parallel and adjacent polyester threads and a matrix material (e.g. an adhesive) that holds the polyester threads together with no gap therebetween (additional description of polyester thread reinforcement strips is provided in the third aspect of this disclosure).

In one embodiment, the horizontally mounted polyester thread reinforcement strips 204 are mounted and secured horizontally over the primary bonding tape 202 to confine and protect the horizontal bed joints 104.

In one embodiment, the width of the horizontally mounted polyester thread reinforcement strips 204 may be in the range of 10-30 mm relative to the horizontal bed joints 104 having a width in the range of 5-80 mm, preferably 5-30 mm, and more preferably 5-15 mm, wherein the horizontally mounted polyester thread reinforcement strips 204 may entirely cover the horizontal bed joints 104.

In one embodiment, the width of the horizontally mounted polyester thread reinforcement strips 204 is in the range of 10-80 mm, preferably 10-40 mm, or around 20 mm relative to the brick masonry column 101 having a height in the range of 1-10 m, preferably 1-5 m, more preferably 1.5-3 m. In one embodiment, the thickness of the horizontally mounted polyester thread reinforcement strips 204 is in the range of 0.5-10 mm, preferably 1-5 mm, and more preferably 1.5-2 mm.

In one embodiment, at least one layer of the horizontally mounted polyester thread reinforcement strips 204 are wrapped around the horizontal bed joints 104.

The width of the primary bonding tape may be equal to or greater than the width of the horizontally mounted polyester thread reinforcement strips. In one embodiment, the width of the primary bonding tape 202 is larger than the width of the horizontally mounted polyester thread reinforcement strips 204.

In one embodiment, a first horizontal bed joint from the bottom of the brick masonry column 101 may be wrapped with at least two layers of the primary bonding tape 202 and at least two layers of the polyester thread reinforcement strips, wherein one of the polyester thread reinforcement strips may be located between the at least two layer of the primary bonding tape 202 to increase joint performance at the first horizontal bed joint.

The reinforced brick masonry column 201, further involves vertically mounted polyester thread reinforcement strips 203 located on each side of the brick masonry column 101.

The vertically mounted polyester thread reinforcement strips as used herein comprise a plurality of parallel and adjacent polyester threads and a matrix material (e.g. an adhesive) that holds the polyester threads together with no gap therebetween (additional description of polyester thread reinforcement strips is provided in the third aspect of this disclosure).

In one embodiment, at least two vertically mounted polyester thread reinforcement strips 203 may be mounted on each side of the brick masonry column 101, and they may be separated by a distance in the range of 2-30 cm, preferably 5-15 cm, and more preferably 10 cm.

In one embodiment, the vertically mounted polyester thread reinforcement strips 203 are mounted vertically along the height of the brick masonry column 101. In one embodiment, the vertically mounted polyester thread reinforcement strips 203 cover at least 50%, or at least 60%, or at least 70%, or at least 80% of the height of the brick masonry column 101, wherein the vertically mounted polyester thread reinforcement strips 203 are mounted on a lower portion of the brick masonry column 101. In one embodiment, the vertically mounted polyester thread reinforcement strips 203 cover at least 50%, or at least 60%, or at least 70%, or at least 80% of the height of the brick masonry column 101, wherein the vertically mounted polyester thread reinforcement strips 203 are mounted on an upper portion of the brick masonry column 101.

In one embodiment, the vertically mounted polyester thread reinforcement strips 203 interweave through the horizontally mounted polyester thread reinforcement strips 204 to form a meshed structure that confines the brick masonry column 101.

In one embodiment, meshes in the meshed structure may have a rectangular shape in the size range of 2-30 cm by 2-30 cm, preferably 5-15 cm by 5-15 cm.

In one embodiment, the width and the thickness of the vertically mounted polyester thread reinforcement strips 203 are substantially similar to the width and the thickness of the horizontally mounted polyester thread reinforcement strips 204.

In one embodiment, the vertically mounted polyester thread reinforcement strips 203 have a thickness at least 5%, or at least 6%, or at least 7%, or at least 8%, or at least 9%, or at least 10%, or at least 15%, or at least 20% greater than the thickness of the horizontally mounted polyester thread reinforcement strips 204. In one embodiment, the thickness of the vertically mounted polyester thread reinforcement strips 203 is in the range of 0.5-10 mm, preferably 1-5 mm, and more preferably 2-3 mm.

In one embodiment, the width of the vertically mounted polyester thread reinforcement strips 203 may be at least 5%, or at least 6%, or at least 7%, or at least 8%, or at least 9%, or at least 10%, or at least 15%, or at least 20% greater than the width of the horizontally mounted polyester thread reinforcement strips 204. In one embodiment, the width of the vertically mounted polyester thread reinforcement strips 203 is in the range of 10-80 mm, preferably 20-50 mm, or around 30 mm.

The reinforced brick masonry column 201, further includes secondary bonding tape wrapped around the horizontally mounted polyester thread reinforcement strips 204.

The secondary bonding tape as used herein may refer to any tape that has a length and a width and has an adhesive layer on at least one side of the tape. In one embodiment, the secondary bonding tape may be a single-sided tape (i.e. a layer of an adhesive on one side of the tape), or a double-sided tape (i.e. two layers of an adhesive on both sides of the tape). In one embodiment, the tape in the secondary bonding tape may be made of plastic (e.g. vinyl or latex), or fabric (e.g. cotton or polyester), and the adhesive layer may be alkyl-acrylates and/or rubber-based adhesives. In one embodiment, the secondary bonding tape 202 may be duct tape, bondage tape, electrical tape, scotch tape, Gorilla Tape®, and/or surgical tape, etc.

In one embodiment, the primary bonding tape 202 and the secondary bonding tape are substantially similar in terms of dimensions, single or double sidedness, material, or any combination thereof.

In one embodiment, at least one layer of the secondary bonding tape is wrapped around the horizontal bed joints 104.

In one embodiment, the width of the horizontal bed joints 104 are in the range of 5-80 mm, preferably 5-30 mm, and more preferably 5-15 mm, and the secondary bonding tape has a width in the range of 10-100 mm, preferably 10-60 umm, more preferably 10-50 mm, and the secondary bonding tape entirely covers the horizontal bed joints 104, the primary bonding tape 202, and the horizontally mounted polyester thread reinforcement strips 204. In one embodiment, the secondary bonding tape only covers at least a portion of the adjoining bricks.

The reinforced brick masonry column 201, further involves a wrapping material 205 that is wrapped horizontally around the perimeter of the brick masonry column 101, the primary bonding tape 202, the horizontally mounted polyester thread reinforcement strips 204, the vertically mounted polyester thread reinforcement strips 203, the secondary bonding tape, or any combination thereof.

In one embodiment, the wrapping material 205 covers at least 50% of the height of the brick masonry column 101, wherein the wrapping material 205 covers the upper half of the brick masonry column 101. In one embodiment, the wrapping material 205 covers at least 50% of the height of the brick masonry column 101, wherein the wrapping material 205 covers the lower half of the brick masonry column 101.

In one embodiment, the wrapping material 205 is made of rubber, nylon, polypropylene, polyvinyl chloride (PVC), low density polyethylene (LDPE), fabric, and/or cardboard.

In one embodiment, the wrapping material 205 has a width in the range of 1-30 cm, preferably 5-10 cm, relative to the height of the brick masonry column 101 which is in the range of 1-10 m, preferably 1-5 m, more preferably 1.5-3 m.

In one embodiment, the wrapping material 205 has a thickness in the range of 0.1-10 mm, preferably 1-5 mm, relative to the height of the brick masonry column 101 which is in the range of 1-10 m, preferably 1-5 m, more preferably 1.5-3 m.

Figure 4:
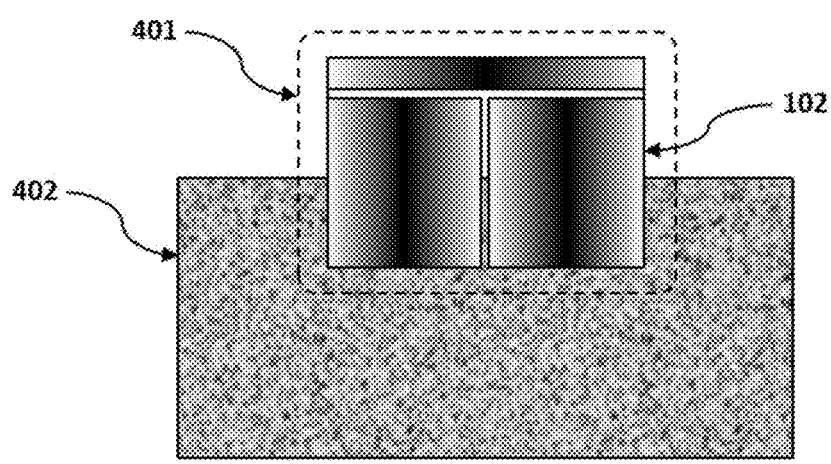
FIG. 4 shows a cement concrete platform which is used as a support pad for the brick masonry column.

In one embodiment, a base 401 of the brick masonry column 101 or the reinforced brick masonry column 201 is secured in a cement concrete pad 402, wherein at least 20%, preferably at least 40%, but no more than 50% of the thickness of the brick 102, which is located at the base 401, is inserted into the cement concrete pad 402, as shown in FIG. 4.

In one embodiment, the brick masonry column 101 and the reinforced brick masonry column 201 are attached to a shake table 301 and transducers 302 to measure dynamic properties such as peak ground acceleration (PGA), strain energy before failure, and post-failure displacement.

A shake table as used herein may refer to a device for shaking a structure or a building with a range of simulated ground motions. Test specimen is fixed on platform of the shake table 301, and it is shaken to the point of failure. Under an applied ground motion, dynamic properties of the test specimen such as peak ground acceleration (PGA), strain energy before failure, and post-failure displacement can be readily measured using video records and/or data from the transducers 302.

Peak ground acceleration (PGA) as used herein refers to a ground shaking that is equal to a maximum ground acceleration that occurs during earthquake shaking. Failure peak ground acceleration is equal to the amplitude of the largest acceleration recorded on the transducers 302. Shake tables may be used to investigate the response of a structure to ground accelerations and to evaluate seismic performance of the structure.

Strain energy before failure as used herein refers to the amount of energy that a structure can absorb without failure in bending/flexural mode. Strain energy before failure for a structure may be measured by integrating a representative force-displacement curve, or a representative stress-strain curve up to a point of failure. Strain energy is the amount of energy absorbed by the structure to bend.

The post-failure displacement at the top of a column as used herein may be a measure of sway at the top of the column after failure (i.e. the post-failure displacement is an indication of column stability after failure by showing how much a failed column move backward and forward, or side to side).

In one embodiment, the reinforced brick masonry column 201 has a failure peak ground acceleration at least 9% higher than a failure peak ground acceleration in the brick masonry column 101. In one embodiment, the failure peak ground acceleration in the reinforced brick masonry column 201 is in the range of 2.4-3.0 m/s$^2$, preferably 2.5-2.65 m/s$^2$, and more preferably 2.6 m/s$^2$. In one embodiment, the failure peak ground acceleration in the brick masonry column 101 is in the range of 2.0-2.6 m/s$^2$, preferably 2.3-2.5 nm/s$^2$, and more preferably 2.4 m/s$^2$.

In one embodiment, the strain energy before failure in the reinforced brick masonry column 201 is 15% higher, preferably 10% higher, and more preferably 5% higher than the strain energy before failure in the brick masonry column 101.

In one embodiment, upon failure the reinforced brick masonry column 201 has a post-failure crack width that is narrower than the post-failure crack width in the brick masonry column 101. In one embodiment, upon failure a wide post-failure crack may be formed at the bottom of the brick masonry column 101, wherein a narrow post-failure crack may be formed along the height of the reinforced brick masonry column 201, implying that the strain energy may be uniformly distributed along the reinforced brick masonry column 201, as oppose to the brick masonry column 101 wherein strain energy may be non-uniformly distributed.

The post-failure crack as used herein may refer to a crack that forms upon failure in the brick masonry column 101, and has the largest width. Width of the crack may be measured with a measuring tape, a laser, a camera and/or a digital image correlation (DIC) system.

Figure 13A:
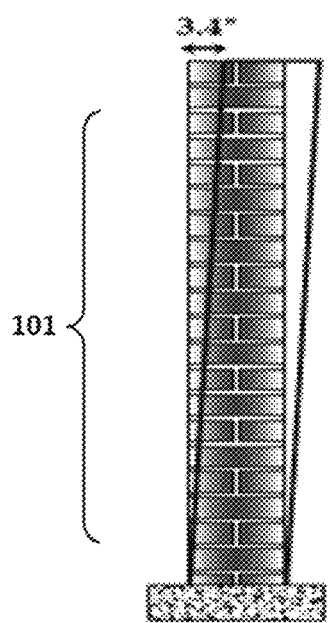
FIG. 13A shows the maximum displacements at the top in the brick masonry column.
Figure 13B:
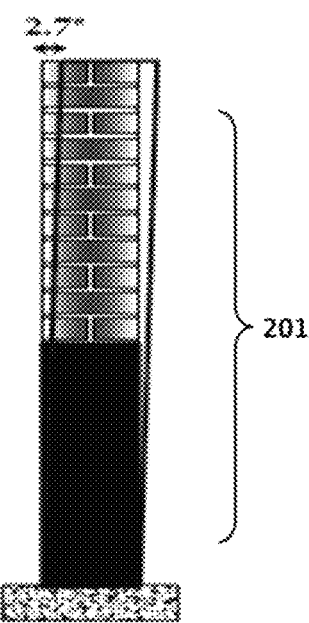
FIG. 13B shows the maximum displacements at the top in the reinforced brick masonry column.

In one embodiment, at ground acceleration equal to the failure peak ground acceleration of the brick masonry column 101, the post-failure displacement at the top of the brick masonry column 101 is in the range of 5-20 cm, preferably 5-10 cm, more preferably around 8.6 cm, as shown in FIG. 13A. In one embodiment, at a ground acceleration equal to the failure peak ground acceleration of the reinforced brick masonry column 201, the post-failure displacement at the top of the reinforced brick masonry column 201 is in the range of 5-15 cm, preferably 5-8 cm, more preferably around 6.8 cm, as shown in FIG. 13B. In one embodiment, the post-failure displacement at the top of the reinforced brick masonry column 201 is at least 30%, preferably 25%, and more preferably 21% lower than the post-failure displacement at the top of the brick masonry column 101.

According to a second aspect, the present disclosure relates to a method of strengthening the brick masonry column 101, involving wrapping the horizontal bed joints 104 in the brick masonry column 101 with at least one layer of the primary bonding tape 202.

In one embodiment, the primary bonding tape 202 may be cut into short primary bonding tape, wherein the width and the thickness of the short primary bonding tape are substantially similar to the primary bonding tape 202 before being cut. In one embodiment, the short primary bonding tape may be secured perpendicular to each other on the horizontal bed joints 104, wherein a first short primary bonding tape is secured on a horizontal bed joint (i.e. is secured in a horizontal fashion) and at least a second short primary bonding tape is secured perpendicular to the first short primary bonding tape (i.e. is secured in a vertical fashion). In one embodiment, the second short primary bonding tape is secured on the horizontal bed joints 104, such that the angle between the first and the second short primary bonding tapes is in the range of 5-175 degrees, preferably 30-150 degrees, more preferably 45-135 degrees.

The method of strengthening further involves wrapping the polyester thread reinforcement strip on the primary bonding tape 202 at the horizontal bed joints 104 to form horizontally mounted polyester thread reinforcement strips 204. In one embodiment, a plurality of the polyester thread reinforcement strips may be wrapped around a horizontal bed joint.

In one embodiment, the polyester thread reinforcement strips may be cut into short strips, wherein the width and the thickness of the short strips are substantially similar to the polyester thread reinforcement strips prior to being cut. In one embodiment, a plurality of the short strips may be mounted on the horizontal bed joints 104 to cover at least a portion of the length of the horizontal bed joints 104. In one embodiment, the short strips are mounted parallel to each other on the horizontal bed joints 104. In one embodiment, a first short strip is mounted on a horizontal bed joint and at least a second short strip is mounted on the first short strip and the horizontal bed joints 104, such that the angle between the first and the second short strips is in the range of 10-170 degrees, preferably 30-150 degrees, more preferably 45-135 degrees.

The method of strengthening further involves vertically mounting the polyester thread reinforcement strips on each side of the brick masonry column 101 to form vertically mounted polyester thread reinforcement strips 203.

In one embodiment, at least one layer of the vertically mounted polyester thread reinforcement strip interweave through the horizontally mounted polyester thread reinforcement strips 204 to form the meshed structure that confines the brick masonry column 101.

In one embodiment, the vertically mounted polyester thread reinforcement strips 203 and the horizontally mounted polyester thread reinforcement strips 204 may be a glued or otherwise secured together at intersections, wherein the horizontally mounted polyester thread reinforcement strips 204 and the vertically mounted polyester thread reinforcement strips 203 intersect.

The method of strengthening a brick masonry column 101 further involves wrapping the horizontally mounted polyester thread reinforcement strips 204 with at least one layer of a secondary bonding tape.

In one embodiment, the secondary bonding tape may be cut into short secondary bonding tape, wherein the width and the thickness of the short secondary bonding tape are substantially similar to the secondary bonding tape prior to being cut. In one embodiment, the short secondary bonding tapes may be secured perpendicular to each other on the horizontal bed joints 104, wherein a first short secondary bonding tape is secured on a horizontal bed joint and at least a second short secondary bonding tape is secured perpendicular to the first short secondary bonding tape. In one embodiment, the second short secondary bonding tape is secured on the horizontal bed joints 104, such that the angle between the first and the second short secondary bonding tapes is in the range of 5-175 degrees, preferably 30-150 degrees, more preferably 45-135 degrees.

The method of strengthening a brick masonry column 101 further involves covering at least a portion of the brick masonry column 101, the primary bonding tape 202, the meshed structure, the secondary bonding tape, or combinations thereof with at least one layer of a wrapping material 205.

In one embodiment, a string, a wire, a cord, a cable with a diameter in a range of 1-20 mm, preferably 1-10 mm, more preferably 1-5 mm, and/or a plastic/cotton rope with a diameter in a range of 1-20 mm, preferably 1-10 mm, more preferably 1-5 mm, may be used to hold the wrapping material 205 around the perimeter of the brick masonry column 101.

In addition to brick masonry columns having rectilinear cross-sections, brick masonry columns having other shaped cross-sections can be envisioned. For example, the brick masonry column may have a circular cross-section (i.e. a cylindrical column), wherein the height is in the range of 1-10 m, preferably 1-5 m, more preferably around 3 m, relative to the diameter which is in the range of 0.2-2 m, preferably 0.5-1 m.

In one embodiment, the brick masonry column has a circular cross-section (i.e. a cylindrical column), wherein the method of strengthening is substantially similar to the method of strengthening in the brick masonry column 101 having a rectilinear cross-section.

In one embodiment, the brick masonry column has a circular cross-section and the polyester thread reinforcement strips are circumferentially mounted around the perimeter of the brick masonry column. In one embodiment, the brick masonry column has a circular cross-section and the polyester thread reinforcement strips are coiled around the perimeter of the brick masonry column.

Figure 5:
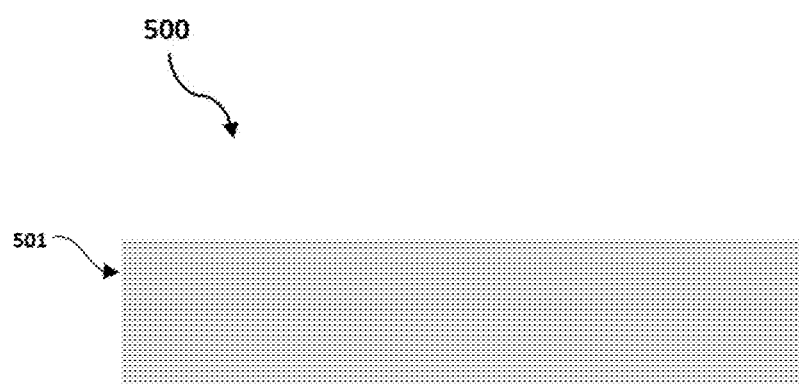
FIG. 5 shows a polyester thread reinforcement strip.

According to a third aspect, the present disclosure relates to a method of manufacturing polyester thread reinforcement strips 500 using a polyester thread 501, as shown in FIG. 5. The method involves, tying a first end of the polyester thread 501 to a first pole of a structure comprising the first pole and a second pole, wherein the first pole and the second pole are substantially similar and parallel to each other, and are separated by a distance in the range of 10-200 cm, preferably 20-100 cm, more preferably around 50 cm.

Polyester threads as used herein may be made by melting a polyester polymer (e.g. polyethylene terephthalate) at a temperature in the range of 200-300° C., preferably 230-300° C., more preferably about 260° C. to form a molten polymer. The molten polymer is then extruded through a spinneret and quenched to form the polyester threads. The polyester threads are wound on large bobbins or flat-wound packages. In one embodiment, the molten polymer is extruded through a die with a circular cross-section and quenched to form the polyester threads. In one embodiment, the die has a rectilinear cross-section.

In one embodiment, polyester threads comprise a plurality of intertwined separate polyester fibrils. Each polyester fibril may have a circular cross-section with the diameter in the range of 10-100 μm, preferably 20-80 μm, preferably 30-70 μm, preferably about 50 μm. In one embodiment, the plurality of intertwined separate polyester fibrils are coated with polyethylene to form the polyester threads.

In one embodiment, the polyester threads have a circular cross-section with the diameter in the range of 0.1-2 mm, preferably 0.5-1 mm.

In one embodiment, the polyester threads include at least one polymer selected from the group consisting of polyglycolide, polylactic acid, polycaprolactone, polyhydroxyalkanoate, polyhydroxybutyrate, polyethylene adipate, polybutylene succinate, polyethylene terephthalate, polybutylene terephthalate, polytrimethylene terephthalate, polyethylene naphthalate, and vectran.

In one embodiment, polyester threads are at least 5%, or at least 10%, or at least 15%, or at least 20%, or at least 30%, or at least 40%, or at least 50%, or at least 60%, or at least 100% more UV resistant than polypropylene threads.

In one embodiment, polyester threads have a tensile strength of at least 5%, or at least 10%, or at least 15%, or at least 20%, or at least 30%, or at least 40%, or at least 50%, or at least 60%, or at least 100% larger than the tensile strength of polypropylene threads.

In one embodiment, polyester threads have a creep resistance of at least 5%, or at least 10%, or at least 15%, or at least 20%, or at least 30%, or at least 40%, or at least 50%, or at least 60%, or at least 100% higher than the creep resistance of polypropylene threads.

In one embodiment, melting point of polyester threads is in the range of 200-300 CC, preferably 230-300° C., more preferably about 260° C. In one embodiment, melting point of polypropylene threads is in the range of 100-200° C., preferably 100-160° C., more preferably about 130° C.

In one embodiment, polyester threads are at least 5%, or at least 10%, or at least 15%, or at least 20%, or at least 30%, or at least 40%, or at least 50%, or at least 60%, or at least 100% more resistant to aging and abrasion than polypropylene threads.

The method of manufacturing further involves winding a second end (i.e. free end) of the polyester thread around the second pole of the structure and returning the second end of the polyester thread to the first pole in stretched form to make a wound cycle, wherein the polyester thread is perpendicular to the first and second poles.

The method of manufacturing further involves repeating the winding at least 20 times in a back and forth movement to form a polyester thread assembly, wherein each polyester thread is adjacent and parallel to the polyester thread from a previous wound cycle, and wherein no gap is present between the adjacent and parallel polyester threads.

No gap as used herein may refer to an embodiment wherein polyester threads are in proximity of each other but not directly adjacent, and a matrix material (i.e. an adhesive) is present between the polyester threads.

The method of manufacturing further involves applying an adhesive to the polyester thread assembly.

In one embodiment, the adhesive may be selected from the group consisting of epoxy, urethane, polyimides, acrylates, polyvinyl acetate, and polyethylene-vinyl acetate.

The method of manufacturing further involves curing and/or drying the adhesive.

Depending on the type of adhesive used, curing and/or drying may be adopted. For example, a solvent based adhesive (e.g. acrylates, or polyvinyl acetate) may require drying. Drying as used herein may refer to an action that removes solvent from the adhesive. Depending on the type of solvent, heating, room-temperature drying, and/or vacuum drying may be used. The adhesives such as epoxy, urethane, polyimides, etc. may require curing to solidify. Curing as used herein may refer to any action that initiates a crosslinking reaction and increases the molecular weight of the adhesive. Curing may be performed by applying heat, and/or UV irradiation to the adhesive.

The method of manufacturing further involves cutting the polyester thread assembly along the first and the second poles and at least 1 cm, or at least 2 cm, or at least 5 cm, or at least 10 cm, from each pole to make the polyester thread reinforcement strip.

In one embodiment, cutting the polyester thread assembly along the first and the second poles forms cut edges on opposing sides of the polyester thread reinforcement strip, and the method further comprises sealing the cut edges of the polyester thread reinforcement strip by heating, annealing and/or taping.

In one embodiment, the polyester thread reinforcement strips may have a width in the range of 10-80 mm, preferably 10-50 mm, relative to the thickness which is in the range of 0.5-10 mm, preferably 1-5 mm, more preferably 1-3 mm. In one embodiment, the length of the polyester thread reinforcement strips may be in the range of 5-200 cm, preferably 20-100 cm, more preferably around 50 cm.

Standard procedure for measuring tensile properties of plastics (ASTM D638) is conducted through the use of a universal testing machine to characterize the tensile properties of the polyester thread reinforcement strips. In one embodiment, the polyester thread reinforcement strip has an ultimate tensile strength at least four times larger and a maximum tensile load bearing capacity at least three times larger than a substantially similar strip with polypropylene threads instead of polyester threads.

Ultimate tensile strength as used herein may refer to a maximum stress in tensile mode that the polyester thread reinforcement strip can endure without failure. Additionally, load bearing capacity as used herein may refer to a maximum load in tensile mode that the polyester thread reinforcement strip can endure without failure. Since ultimate tensile strength is a geometry-independent property (i.e. independent of dimensions of the polyester thread reinforcement strip), it may be the preferred quantity over the load bearing capacity, which is a geometry-dependent property (i.e. depends on dimensions of the polyester thread reinforcement strip).

In one embodiment, the method of manufacturing further comprises a polyester fabric, a polyester blend fabric, and/or a cotton fabric instead of the polyester thread assembly, to produce a fabric reinforcement strip. In one embodiment, the adhesive may be applied to a stack of polyester fabrics to produce the fabric reinforcement strip. In one embodiment, the stack of polyester fabrics comprises at least a plurality of polyester fabrics. In one embodiment, the stack of polyester fabrics comprises a first polyester fabric and a second polyester fabric, wherein the angle between polyester threads in the first polyester fabric and polyester threads in the second polyester fabric may be in the range of 0-180 degrees, preferably 30-150 degrees, more preferably 45-135 degrees.

In one embodiment, manufacturing cost for the reinforced brick masonry column using the method of strengthening is at least 80%, or at least 90%, or at least 100%, or at least 120% less expensive than steel-jacket strengthening method. In one embodiment, manufacturing cost for the reinforced brick masonry column using the method of strengthening is at least 150%, or at least 180%, or at least 200%, or at least 220% less expensive than concrete-jacket strengthening method. In one embodiment, manufacturing cost for the reinforced brick masonry column using the method of strengthening is at least 1500%, or at least 2000%, or at least 2500%, or at least 2800% less expensive than FRP-jacket (Fiber Reinforced Polymer) strengthening method. In one embodiment, the method of strengthening does not require skilled labor, as oppose to steel-jacket, concrete-jacket, or FRP-jacket strengthening methods, wherein skilled labor is required.

The examples below are intended to further illustrate protocols for designing and manufacturing the reinforced brick masonry column 201 and the polyester thread reinforcement strip, as well as characterizing and comparing seismic and mechanical performances and are not intended to limit the scope of the claims.

Example 1

Figure 3:
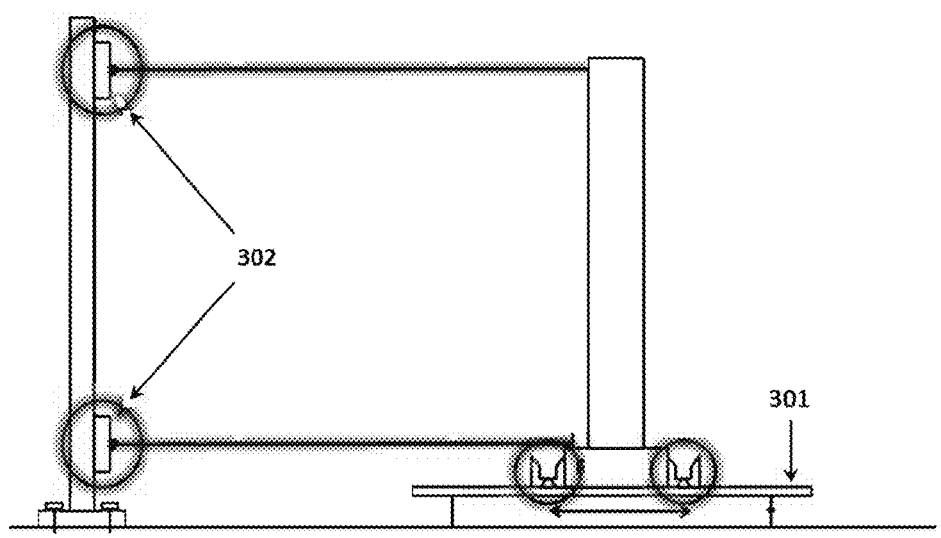
FIG. 3 represents an experimental setup of a masonry column on a shake table.

A brick masonry column, as shown in FIG. 1A, was used as the test specimen in the present study. The test specimen had a square cross-section of 9 inch×9 inch (0.23 m×0.23 m) and 6 ft (1.83 m) height. Three identical test specimens were tested; an unstrengthened column (i.e. unreinforced or control), and two strengthened columns (i.e. reinforced) with certain configuration of polyester strips. In the strengthened columns, each polyester strip was mounted at the joint of bricks and wrapped using a bonding tape, followed by a global wrapping from the bottom of the column as shown in FIG. 2A. Shake test was conducted on a uniaxial shaking table as shown in FIG. 3. Bottom ends of all the specimens were fixed to the shaking table whereas the top end was free to sway as shown in FIG. 3.

Example 2

Strengthening of specimens was done up to half of the column height. All three specimens were erected with the specifications as shown in Table 1. First course of the bricks was laid in a manner that half brick was embedded into the 5 inch (0.13 m) thick 1:2:4 reinforced cement concrete pad as shown in FIG. 4. This reinforced cement concrete pad was a non-structural element, which was used as a platform over which the columns were erected.

TABLE 1

Specimen description

| No. | Description | Measurements |
|---|---|---|
| 1 | Average Brick Size | 9" × 4.5" × 3" (0.23 m × 0.11 m × 0.08 m) |
| 2 | Cement Sand Mortar | 1:4 |
| 3 | Cement | Ordinary Portland Cement |
| 4 | Sand | locally available |
| 5 | Bed Joint Thickness | 0.394 in (0.01 m) |
| 6 | Curing Time | 7 days |

Example 3

End of a polyester thread was first tied from one side to the pole. It was taken to the other end in fully stretched form, wound around it and brought back to the tied end. This action completed one cycle and 30 similar cycles were completed to obtain the desired width of the strip which was 22 mm. The width of the strip was chosen so as to cover the entire width of the mortar joint and some portion of the adjoining bricks. It was ensured that during this procedure no space remains between two adjacent horizontal runs of the thread. After this, an adhesive was applied on the pre-tensioned thread assembly and allowed to dry for 24 hours. When the adhesive dried and threads held on to each other, small pieces of bonding tape were attached to these strips at gradual intervals to avoid overturning of threads at later stages of application. Ends of the strengthening strips were than sliced by 25 mm on either side to avoid shear splitting of the strands and sealed by applying heat so as to avoid the loss in pre-tensioning force. Additionally, the cutting ends were bonded and taped more to prevent de-bonding along the horizontal runs of thread. The final form of dried strengthening strip is shown in FIG. 5.

Example 4

Further characterization was performed on the bricks and the strips. Brick test was conducted according to Section 7 and 8 of ASTM C-67 for their compressive strength and water absorption. Results are shown in Table 2, and Table 3. Tensile test was conducted on the manufactured strengthening strips, and also the commercially available polypropylene bands (pp-band) with the size of 0.6 in×0.02 in (0.015 m×0.0005 m) for comparison. Results are shown in Table 4, and Table 5. Average tensile load bearing capacity of these newly developed strengthening strips was measured to be approximately 0.70 Ton (6975 N), which was at least three times larger than that of the commercially available pp-band which was measured to be about 0.22 Ton (2192 N). Average failure tensile load of pp-band with same cross-sectional area found by other researchers is reported to be around 0.18 Ton (1794 N), which is compatible with the current findings. [Sathiparan, N., Mayorca, P., Nesheli, K. N., Guragain, R. and Meguro, K.: "Experimental study on in-plain and out-of-plain behaviour of Masonry Wallettes retrofitted by PP-Band meshes", Seisan Kenkyu, 58 (3): 197-213 (2006); Meguro, K., Mayorca, P., Sathiparan, N., Guragain, R., and Nesheli, N.: "Shaking Table Tests of ¼ Scaled Masonry Models Retrofitted with PP-band Meshes", Proceedings of the Third International Symposium on New Technologies for Urban Safety of Mega Cities in Asia, Singapore, 1: 9-18, (2005); Navaratnarajah, S.:" Experimental study of PP-band mesh seismic retrofitting for low earthquake masonry resisting structures: PhD Dissertation, Department of Civil Engineering, University of Tokyo, Japan, (2008); incorporated herein by reference in its entirety]

TABLE 2

Compressive strength test on brick units
Compressive Strength Test on Brick Units

| Sample No. | Dimension of Brick (inches) | Surface Area (inch²) | (mm²) | Max Load Applied (Tons) | (KN) | Compressive strength (Psi) | N/mm² |
|---|---|---|---|---|---|---|---|
| 1 | 8.9 × 4.4 × 3 | 39.16 | 25264 | 54 | 538 | 3039 | 20.95 |
| 2 | 9 × 4.4 × 3 | 39.6 | 25548 | 43 | 428 | 2393 | 16.5 |
| 3 | 8.9 × 4.5 × 3 | 40.05 | 25839 | 44 | 438 | 2421 | 16.7 |
| 4 | 8.9 × 4.4 × 3 | 39.16 | 25264 | 52 | 518 | 2927 | 20.18 |
| 5 | 8.9 × 4.4 × 3 | 40.05 | 25839 | 43 | 428 | 2340 | 16.13 |
|  |  |  |  |  | Mean | 2624 | 18.09 |

TABLE 3

Water absorption test on brick units
Percentage Absorption test on Brick Units

| Sample No. | Wet Weight of Sample (gm) | Dry Weight of Sample (gm) | % Water Absorption |
|---|---|---|---|
| 1 | 3782 | 3456 | 9.4 |
| 2 | 3816 | 3466 | 10.0 |
| 3 | 3805 | 3400 | 11.9 |
| 4 | 3792 | 3462 | 9.5 |
| 5 | 3808 | 3458 | 10.0 |
|  |  | Mean | 10.2 |

TABLE 4

Direct tension test on polyester strips
Direct Tension Test on Strips

| Sample No. | Failure Tensile Load (Tons) | (N) | Ultimate Stress (N/mm²) |
|---|---|---|---|
| 1 | 0.70 | 6975 | 930 |
| 2 | 0.69 | 6875 | 916.6 |
| 3 | 0.71 | 7074 | 943.2 |
| Mean | 0.70 | 6975 | 930 |

TABLE 5

| | Direct tension test on pp-band Direct Tension Test on PP-Band | | |
|---|---|---|---|
| Sample | Failure Tensile Load (Tons) | | Ultimate Stress |
| No. | (Tons) | (N) | (N/mm$^2$) |
| 1 | 0.22 | 2192 | 199.3 |
| 2 | 0.22 | 2192 | 199.3 |
| 3 | 0.21 | 2092 | 190.2 |
| Mean | 0.22 | 2192 | 199.3 |

Example 5

The strengthening process started by tightly wrapping the polyester strips (PS), by hand, at the base joint of the column, as it was anticipated that the failure initiates at the joints. The wrapping of the PS was followed by first wrap of strong bonding tape. It was also anticipated that in the absence of any axial loading on top of the column, the failure might be confined at the base of the column. Therefore, one extra PS was provided between the first and the second bed joint. Afterwards, a global wrap of strong bonding tape was applied at the base of the column. Vertical PS strips were provided with the sewing action for added confinement. Spacing of the mesh was kept at 4 inch×4 inch (0.10 m×0.10 nm). Upon completion of the mesh, each bed-joint was wrapped with two rounds of the binding tape. Cut-off ends of the tape were given on the out-of-plane face to prevent any de-bonding of tape due to in-plane forces. As the final step, a global wrap was used to protect the column and keep the reinforcement components in place.

Example 6

Figure 6:
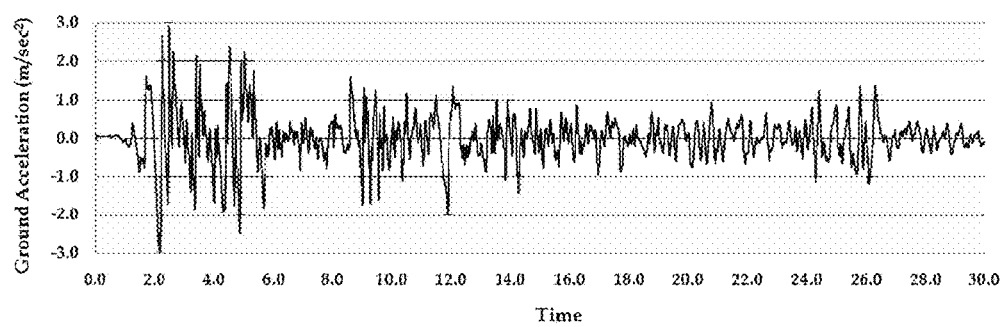
FIG. 6 shows the East-West component of the acceleration time-history of El-Centro earthquake.

East-West component of the acceleration time-history of El-Centro earthquake as shown in FIG. 6, was gradually increasing intensities using the single degree of freedom shaking table till the specimens failed by showing large unstable displacements or toppling over, after which they were observed for failure pattern. Feedback ground motion response and displacement response of the specimens were recorded using a data acquisition system and displacement transducers. The specimen was attached fixed to the shake table (as shown in FIG. 3) to arrest its movement during testing. No vertical axial load was applied on top of the column as the aim of this study was to test the specimen under least favorable conditions, however it is noted that adding vertical compressive loading on top the unstrengthened brick masonry columns may positively increase the strengthening performance as the loading may reduce sway of the column thereby making the strengthening more effective. However, adding the weight of the column might lead to crush the bricks during the dynamic testing which could affect its cracking pattern. In the reinforced brick masonry column tested here, the base has a global wrapping and thus crushed bricks at the base confined in place without having adverse effect on the dynamic performance of the column.

Example 7

Figure 7:
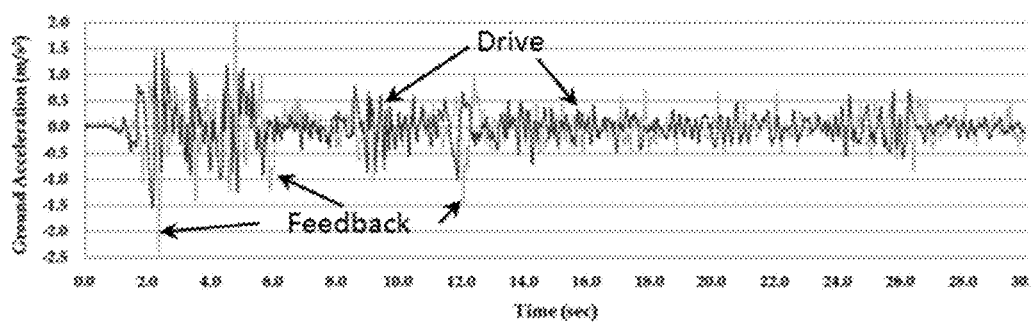
FIG. 7 represents an overlay of drive ground acceleration applied to a brick masonry column, and the resulting feedback ground acceleration.

Three test specimens were tested in the present study; one control specimen (i.e. without any strengthening), and two strengthened specimens. Both of the strengthened specimens were applied to the same ground motion acceleration. The following section presents the results of strengthened specimen when compared to the control specimen. FIG. 7 indicates that the drive ground acceleration given to the specimen and the feedback ground acceleration had little disparity, which ascertains the accuracy of the response as presented below. It is to be mentioned here that the small disparity in the drive and feedback is owing to the noise in the electrical signal received by the accelerometer mounted on top of the actuator; however, the values presented are within the acceptable limits.

Figure 8:
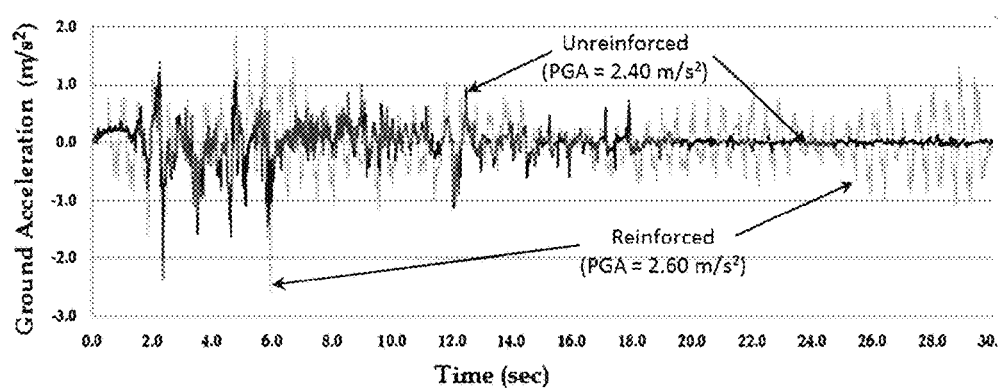
FIG. 8 shows the feedback ground acceleration of the brick masonry column and the reinforced brick masonry column.

FIG. 8 presents the peak ground acceleration (PGA) response of the strengthened specimen and the unstrengthened control specimen. It can be seen that the strengthened specimen performed much better than the control specimen. It failed at a peak ground acceleration of 2.60 m/sec$^2$; which is about 9% higher than the failure peak ground acceleration of control specimen which was 2.40 m/sec$^2$. Furthermore it can be seen from FIG. 8 that the strengthened specimen depicted a much smoother response to the ground excitation with periodic sinusoidal motion up to 30 seconds, whereas the control specimen displays an erratic motion resulting in base cracking failure at around 18 seconds.

Figure 9:
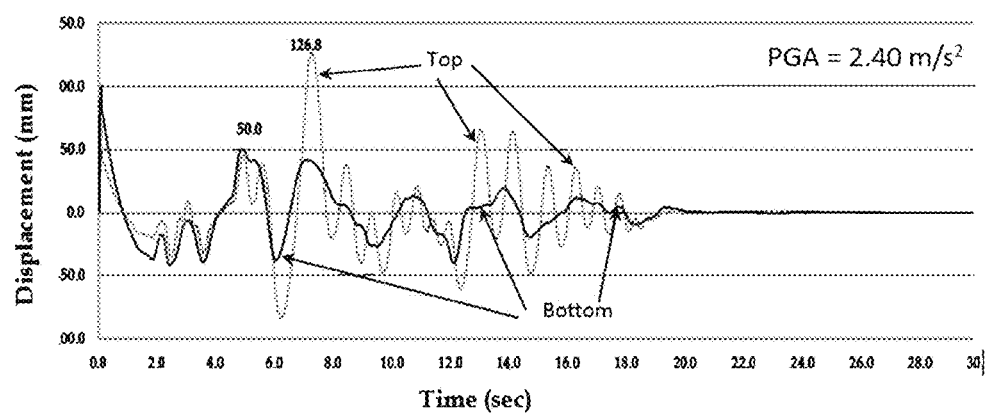
FIG. 9 shows the top and bottom displacement of the brick masonry column at a peak ground acceleration of 2.40 m/s$^2$.
Figure 10:
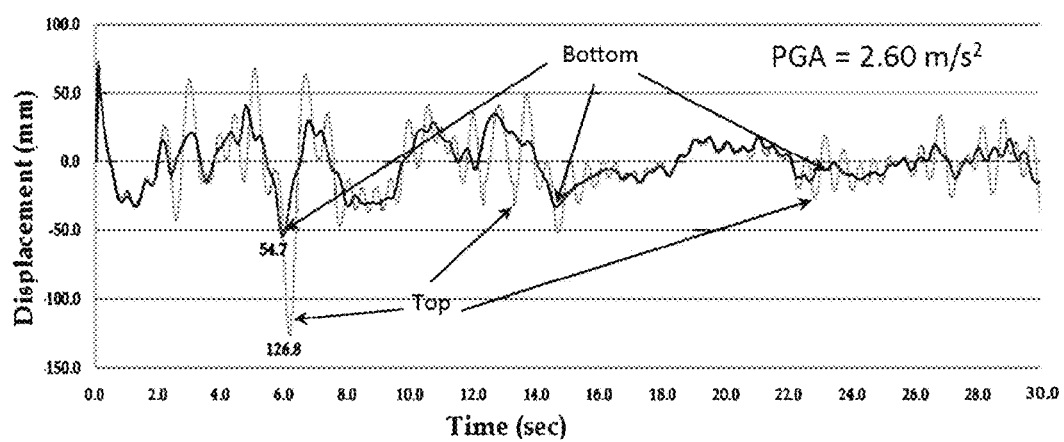
FIG. 10 shows the top and bottom displacement of the reinforced brick masonry column at a peak ground acceleration of 2.60 m/s$^2$.

Furthermore the displacement response of control and strengthened specimen was studied to better evaluate their performance. The intent here was to investigate the deformational response and the cracking pattern. A detailed literature review was conducted to understand the crack initiation and propagation mechanism to better understand the cracking response. [Moussa, A., Bell, R. and Tan, L. C.: "The interaction of two parallel semi-elliptical surface cracks under tension and bending", Journal of Pressure Vessel Technology, 121: 323-326, (1999); Ishida, M., Yoshida, T. and Noguchi, H.: "Parallel array of semi-elliptical surface cracks in semi-infinite solid under tension", Journal of Engineering Fracture Mechanics, 39(5): 845-850, (1991); Shu, M. H., Petit, J. and Bezine, G.: "Stress Intensity factors for several groups of equal and parallel cracks in finite plates", Journal of Engineering Fracture Mechanics, 49(6): 933-941, (1994); Kamaya, M.: "A crack growth evaluation method for interacting multiple cracks", JSME International Journal, 46(1):15-23, (2003); incorporated herein by reference in its entirety] The displacement response of control specimen obtained at failure peak ground acceleration of 2.40 m/sec$^2$ was plotted versus time as shown in FIG. 9. It can be seen from the above figure that the specimen moved as a whole for the first six seconds as the top and bottom end displacements are comparable. Afterwards the specimen cracked and reached its maximum displacement of 5 inches between the sixth and seventh second. The shake table was shut down at this point because the column was unconfined and showed ominous signs of toppling. As a result both curves gradually reduce to zero completing the 30 second period. The displacement response of strengthened specimen is also plotted as shown in FIG. 10 having a peak ground failure acceleration of 2.60 m/sec$^2$.

Figures 11A, 11B:
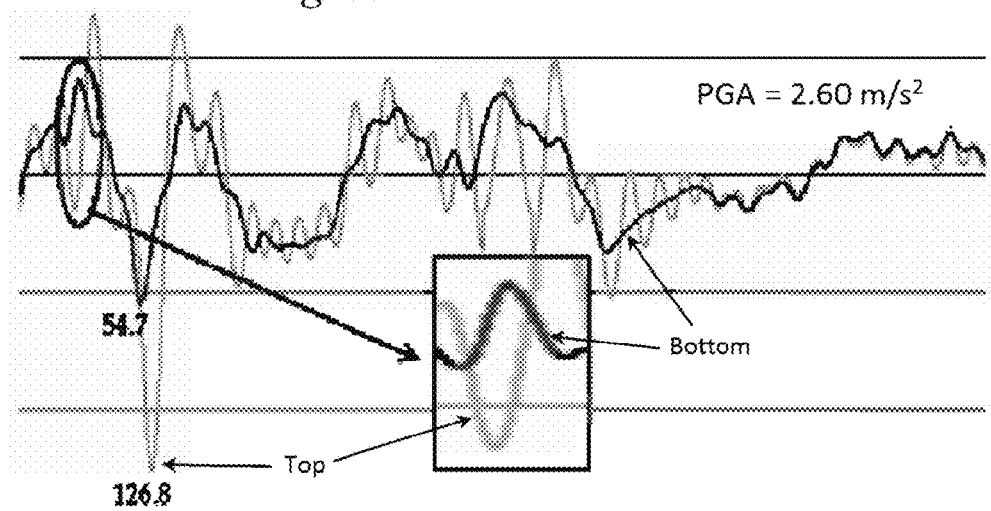
FIG. 11A shows the displacement response in the reinforced brick masonry column prior to failure.
FIG. 11B shows the change of mode in displacement response in the reinforced brick masonry column prior to failure.

FIG. 11A also represents the top and bottom displacement response of the strengthened specimen prepared using the reading collected from displacement transducers. The purpose of this figure is to present the displacement response of the column subject to ground excitation. From the figure, it is clear that the top and bottom end displacements are comparable for the first two and a half seconds after which the top end began to sway largely indicating the initiation of cracking in the joints of the unstrengthened brick masonry colunm. It cracked between the sixth and seventh second but still did not topple as its base was confined keeping the specimen intact at its position. The specimen was able to sustain the ground motion for full 30 seconds.

Figure 12:
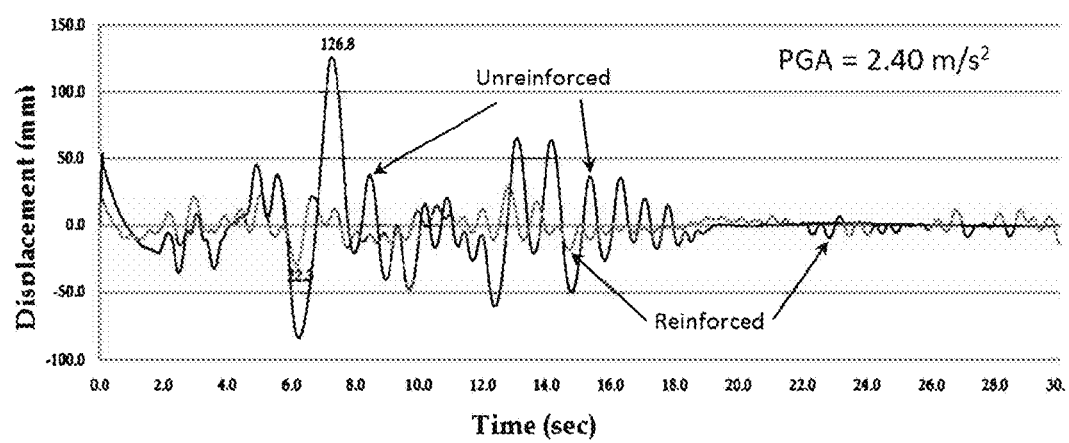
FIG. 12 shows an overlay of the top displacement of the brick masonry column and the reinforced brick masonry column at a peak ground acceleration of 2.40 m/s$^2$.

It is interesting to mention the change of mode prior to failure peak as shown in FIG. 11B, which was not observed in the displacement response of control specimen as shown in FIG. 9. This observation indicates the effectiveness of confinement in the strengthened specimen. From the figure it is possible to identify the exact location of the mode change. The mode change indicates that a portion of the applied energy was absorbed by the strengthened specimen towards changing the mode. Therefore, the strengthened specimen could sustain larger ground accelerations compared to the unstrengthened specimen. FIG. 12 shows the displacement of the top portion of the strengthened and the control specimens at a constant ground acceleration of 2.40 m/sec$^2$. The objective of this result is to compare the dynamic response of strengthened and unstrengthened column at peak ground displacement of control column so that a clear picture regarding the overall performance of the unstrengthened brick masonry column can be established. It is observed that when control specimen was cracked and reached its maximum displacement of about 5 inches, the strengthened specimen was still uncracked and had displaced only about 1 inch as a result of enhanced confinement provided by the strips and the tapes. Therefore, the strengthened specimen was better able to endure the e deformations which resulted in smaller displacements at the top leading to a reduced degree of damage. FIG. 13A represents the top end displacement of control specimen, and FIG. 13B represents the top end displacement strengthened specimens with respect to their bottom end displacements at the corresponding failure peak ground acceleration (i.e. 2.40 m/sec$^2$ for the control, and 2.60 m/sec$^2$ for the strengthened specimen). It is seen that the strengthened specimen, FIG. 13B, showed a reduced post cracking displacement that the unstrengthened specimen, FIG. 13A, by around 21% implying that the strengthened specimen has an improved dynamic performance and reduced damage.

Example 8

Figures 14A, 14B:
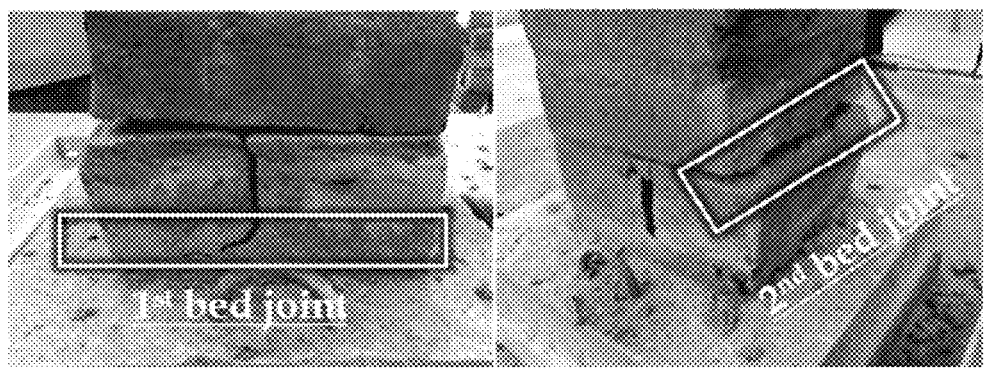
FIG. 14A shows the crack pattern after failure in the first bed joint of the brick masonry column.
FIG. 14B shows the crack pattern after failure in the second bed joint of the brick masonry column.
Figures 15A, 15B:
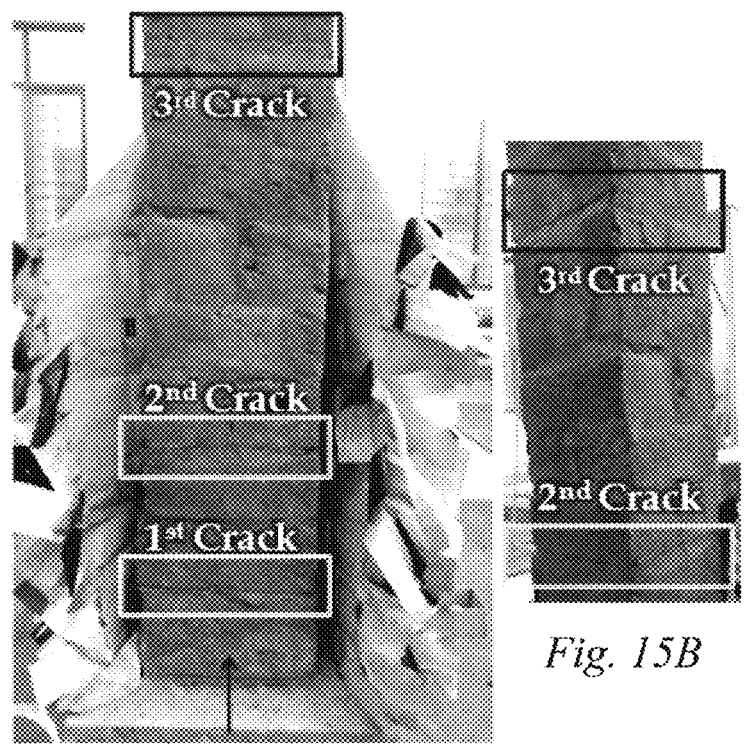
FIG. 15A shows the first, the second, and the third cracks in the reinforced brick masonry column after failure.
FIG. 15B shows the second and the third cracks in the reinforced brick masonry column after failure.

FIG. 14A and FIG. 14B reveal the post-failure cracks in the control specimen. It can be seen that the specimen cracked from the base leading to a large overturning and shear forces. These forces were induced as the top end tried to sway greater than the bottom end. First and second bed-joints underwent total failure with wide cracks of almost 0.3 in (7.6 mm). Both the strengthened specimens were unwrapped prior to crack inspection along the highlighted planes using a blade cutter. The purpose of the unwrapping sequence was to inflict as little changes to the internal geometry as possible so as to obtain an undisturbed analysis. Care was taken not to cut the strips before observing their condition and similarly other faces were uncovered to check the cracks. The first strengthened specimen was also cracked from the base but with a noticeable difference in the crack size. In fact, crack size in the strengthened specimen was significantly narrower than the crack size in the control specimen. Accordingly, the second strengthened specimen was unwrapped in a same sequence as explained above. However, after scrutinizing the cracks of first strengthened specimen one important change was made before strengthening the second one. Instead of placing the polyester strip mesh directly on the bed-joints as in the first case, all the horizontal bed-joints were first wrapped tightly by two rounds of binding tape and then the strips were fixed in position. Remaining sequence was unchanged. Since the binding tape sticks more strongly to its own surface as compared to masonry, this specimen failed at a peak ground acceleration of 2.60 m/sec$^2$, as oppose to the first strengthened specimen that was failed at a peak ground acceleration of 2.55 m/sec$^2$. This specimen not only failed at the largest peak ground acceleration, but also revealed a better protection from damage at the base, as shown in FIG. 15A and FIG. 15B. As a result of a slight change in the manufacturing method, base of this specimen sustained greater ground accelerations.

An inexpensive strengthening technique for masonry structures was presented wherein polyester thread strips were used to reinforce brick masonry columns. Some dynamic and seismic properties of the unreinforced and reinforced brick masonry columns were measured and reported using a shake table.

The inexpensive strengthening technique of the present disclosure provides a reinforced masonry column that has many advantages over the unreinforced column. The technique does not require any skilled labor and it can easily be adopted for strengthening unreinforced brick masonry columns for under privileged localities using locally available resources and manpower. The polyester thread strips were shown to be effective in improving the stiffness and deformational response by providing confinement to the column. The polyester thread strips revealed larger tensile strength compared to commercially available polypropylene bands. The polyester thread strips resulted in a uniform stress distribution along the strengthened zone as evident by evenly distributed cracks, whereas the control specimen failed with one large crack at the bottom of the column.

The present disclosure provides a practical technique in remote impoverished areas by relying on local resources and manpower. A cost analysis revealed that the current method is more economic compared to other existing methods as it employs locally available resources and manpower, and it does not require skilled labor.

The invention claimed is:

1. A method of manufacturing polyester thread reinforcement strips, comprising:
    tying a first end of a polyester thread to a first pole of a structure comprising the first pole and a second pole, wherein the first pole and the second pole are parallel and separated by at least 20 cm;
    winding a second end of the polyester thread around the second pole of the structure and returning the second end of the polyester thread to the first pole in stretched form to make a wound cycle, wherein the polyester thread is perpendicular to the first and the second poles;
    repeating the winding at least 20 times in a back and forth movement to form a polyester thread assembly, wherein each polyester thread is adjacent and parallel to the polyester thread from a previous wound cycle, and wherein no gap is present between the adjacent and parallel polyester threads;
    applying an adhesive to the polyester thread assembly;
    curing and/or drying the adhesive; and
    cutting the polyester thread assembly along the first and the second poles and at least 1 cm from each pole to make the polyester thread reinforcement strip.

2. The method of claim 1, wherein the cutting forms cut edges on Opposing sides of the polyester thread reinforcement strip, and the method further comprises sealing the cut edges of the polyester thread reinforcement strip by heating, annealing and/or taping.

3. The method of claim 1, wherein the polyester thread reinforcement strip has an ultimate tensile strength at least four times larger and a maximum tensile load bearing capacity at least three times larger than a substantially similar strip with polypropylene threads instead of polyester threads.

* * * * *